United States Patent
Gardner et al.

(10) Patent No.: US 9,822,685 B2
(45) Date of Patent: Nov. 21, 2017

(54) WATER INJECTION EXHAUST TREATMENT SYSTEM

(71) Applicant: Tenneco Automotive Operating Company Inc., Lake Forest, IL (US)

(72) Inventors: Timothy P. Gardner, Canton, MI (US); Padmanabha Reddy Ettireddy, Canton, MI (US); Adam J. Kotrba, Laingsburg, MI (US); Michael Golin, Dexter, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 615 days.

(21) Appl. No.: 14/512,609

(22) Filed: Oct. 13, 2014

(65) Prior Publication Data

US 2015/0047326 A1    Feb. 19, 2015

Related U.S. Application Data

(63) Continuation-in-part of application No. 14/389,224, filed as application No. PCT/CN2013/081643 on Aug. 16, 2013, now Pat. No. 9,334,775.

(51) Int. Cl.
*F01N 3/20*        (2006.01)

(52) U.S. Cl.
CPC .......... *F01N 3/208* (2013.01); *F01N 2610/02* (2013.01); *F01N 2610/085* (2013.01);
(Continued)

(58) Field of Classification Search
CPC .................. F01N 3/208; F01N 2610/02; F01N 2610/085; F01N 2610/1406;
(Continued)

(56) References Cited

U.S. PATENT DOCUMENTS

| 2,867,497 A | 1/1959 | Calvert |
| 8,250,856 B2 | 8/2012 | Ohashi |

(Continued)

FOREIGN PATENT DOCUMENTS

| CN | 101408122 A | 4/2009 |
| CN | 202132088 U | 2/2012 |
| CN | 202497790 U | 10/2012 |
| CN | 202606021 U | 12/2012 |
| CN | 101900024 B | 10/2013 |

(Continued)

*Primary Examiner* — Jorge Leon, Jr.
(74) *Attorney, Agent, or Firm* — Harness, Dickey & Pierce, P.L.C.

(57) ABSTRACT

An exhaust aftertreatment system may include a reductant supply and diluent supply conduits, an injector and a control module. The reductant supply conduit includes a first valve controlling a flow of reductant through the reductant supply conduit. The diluent supply conduit includes a second valve controlling a flow of diluent through the diluent supply conduit. The injector is in fluid communication with the reductant supply conduit and the diluent supply conduit and is configured to provide fluid to an exhaust stream. The control module may control the first valve to provide a targeted amount of reductant through the injector. The control module may control the second valve to maintain a fluid flow rate through the injector that is at or above a minimum flow rate threshold of the injector based on a difference between a flow rate through the reductant supply conduit and the minimum flow rate threshold.

34 Claims, 3 Drawing Sheets

(52) U.S. Cl.
CPC .. *F01N 2610/144* (2013.01); *F01N 2610/146* (2013.01); *F01N 2610/1406* (2013.01); *F01N 2610/1426* (2013.01); *F01N 2610/1433* (2013.01); *F01N 2610/1453* (2013.01); *F01N 2610/1473* (2013.01); *F01N 2610/1493* (2013.01); *F01N 2900/1812* (2013.01); *F01N 2900/1818* (2013.01); *Y02T 10/24* (2013.01)

(58) Field of Classification Search
CPC ....... F01N 2610/1426; F01N 2610/144; F01N 2610/1453; F01N 2610/1473; F01N 2610/1493; F01N 2900/1812; F01N 2900/1818
USPC ........................... 60/274, 286, 295, 301, 318
See application file for complete search history.

(56) References Cited

U.S. PATENT DOCUMENTS

| | | |
|---|---|---|
| 2010/0242439 A1 | 9/2010 | Domon et al. |
| 2010/0300074 A1 | 12/2010 | Mullins et al. |
| 2011/0126514 A1 | 6/2011 | Brammell |
| 2012/0299205 A1 | 11/2012 | Lee et al. |
| 2013/0101472 A1* | 4/2013 | Lee ................. F01N 3/2066 422/168 |
| 2014/0260199 A1* | 9/2014 | Grzesiak ............ F01N 3/0871 60/274 |

FOREIGN PATENT DOCUMENTS

| | | |
|---|---|---|
| EP | 1656986 A1 | 5/2006 |
| JP | 2006-122878 A | 5/2006 |
| JP | 2007077875 A | 3/2007 |

\* cited by examiner

|  | Urea (40%) Flow Rate | Water Flow Rate | Total Concentration | Total Flow Rate |
|---|---|---|---|---|
| Example 1 | 10 g/s | 0 g/s | 40% | 10 g/s |
| Example 2 | 10 g/s | 2.5 g/s | 32% | 12.5 g/s |
| Example 3 | 10 g/s | 10 g/s | 20% | 20 g/s |
| Example 4 | 20 g/s | 0 g/s | 40% | 20 g/s |
| Example 5 | 20 g/s | 5 g/s | 32% | 25 g/s |
| Example 6 | 20 g/s | 20 g/s | 20% | 40 g/s |
| Example 7 | 5 g/s | 5 g/s | 20% | 10 g/s |

WATER INJECTION EXHAUST TREATMENT SYSTEM

CROSS-REFERENCE TO RELATED APPLICATIONS

This application is a continuation-in-part of U.S. patent application Ser. No. 14/389,224 filed on Sep. 29, 2014, which is a National Stage of International Application No. PCT/CN2013/081643 filed on Aug. 16, 2013. The entire disclosures of the above applications are incorporated herein by reference.

FIELD

The present disclosure relates to an exhaust treatment system having water injection.

BACKGROUND

This section provides background information related to the present disclosure and is not necessarily prior art.

Selective catalytic reduction technology has been used in conjunction with reducing nitrogen oxides present in the exhaust of combustion engines. Many vehicles utilizing combustion engines are equipped with exhaust aftertreatment devices for reducing nitrogen oxide emissions. Some of these systems are constructed using urea-based technology including a container for storing the urea and a delivery system for transmitting the urea from the container to the exhaust stream. While these systems may have performed well in the past, it may be desirable to provide an air-assisted delivery system to more efficiently and effectively deliver the urea (or other reductant) to the exhaust stream. Furthermore, it may be desirable to purge the delivery system with water and/or air to maintain the efficiency and effectiveness of delivery system.

SUMMARY

This section provides a general summary of the disclosure, and is not a comprehensive disclosure of its full scope or all of its features.

In one form, the present disclosure provides an exhaust treatment system that may include a gas supply conduit, a reductant supply conduit, a diluent supply conduit, a nozzle and a pump. The gas supply conduit may be in fluid communication with a source of compressed gas and may include a first valve controlling a flow of compressed gas through the gas supply conduit. The reductant supply conduit may be in fluid communication with a reductant source. The diluent supply conduit may be in fluid communication with a diluent source (e.g., a source of water) and may include a second valve controlling a flow of diluent through the diluent supply conduit. The nozzle may be in fluid communication with the gas supply conduit, the reductant supply conduit and the diluent supply conduit. The pump may be disposed between the nozzle and the second valve and may be in fluid communication with the reductant supply conduit and the diluent supply conduit. The pump may be operable in a first pumping direction to pump reductant from the reductant source to the nozzle and in a second pumping direction to pump reductant away from the nozzle and toward the reductant source.

In some embodiments, the pump may be operable in the first pumping direction to pump diluent from the diluent source to the nozzle.

In some embodiments, the pump may be operable in the second pumping direction to pump diluent away from the nozzle and toward the reductant source and/or the diluent source.

In some embodiments, the reductant supply conduit may include a third valve movable between open and closed positions to control a flow of reductant between the reductant source and the pump.

In some embodiments, the exhaust treatment system may include a filter disposed between the pump and the second valve. The filter may be in fluid communication with the reductant supply conduit and the diluent supply conduit.

In some embodiments, the source of compressed gas may include a source of compressed air. In other embodiments, the source of compressed gas could include additional or alternative gases.

In some embodiments, the gas supply conduit may be in fluid communication with parallel first and second gas flow paths.

In some embodiments, the first gas flow path may include a third valve that is movable between a first position allowing gas flow through the first gas flow path and a second position restricting gas flow through the first gas flow path.

In some embodiments, the first gas flow path may fluidly couple the gas supply conduit with a conduit extending between the pump and a first inlet of the nozzle.

In some embodiments, the second gas flow path may bypass the third valve and couples the gas supply conduit with a second inlet of the nozzle disposed between the first inlet and an outlet of the nozzle.

In some embodiments, the second gas flow path may include a restrictor.

In some embodiments, the reductant supply conduit may include a fourth valve movable between open and closed positions to control a flow of reductant between the reductant source and the pump.

A method of operating the exhaust treatment system may include operating the exhaust treatment system in a first purge mode in which the pump is operating in the second pumping direction, the fourth valve is open and the first, second and third valves are closed; operating the exhaust treatment system in a second purge mode in which the pump stops operating, the second valve is closed and the first, third and fourth valves are open; operating the exhaust treatment system in a third purge mode in which the pump is operating in the first pumping direction, the second valve is open and the first, third and fourth valves are closed; operating the exhaust treatment system in a fourth purge mode in which the pump is operating in the second pumping direction, the second valve is open and the first, third and fourth valves are closed; and operating the exhaust treatment system in a fifth purge mode in which the fourth valve is closed and the first, second and third valves are open.

In some embodiments, the second purge mode may be performed after the first purge mode; the third purge mode may be performed after the second purge mode; the fourth purge mode may be performed after the third purge mode; and the fifth purge mode may be performed after the fourth purge mode.

In another form, the present disclosure provides an exhaust treatment system that may include a gas supply conduit, a reductant supply conduit, a diluent supply conduit, a nozzle, a pump, and first and second gas flow paths. The gas supply conduit may be in fluid communication with a source of compressed gas and may include a first valve controlling a flow of compressed gas through the gas supply conduit. The reductant supply conduit may be in fluid communication with a reductant source. The diluent supply conduit may be in fluid communication with a diluent source and may include a second valve controlling a flow of diluent through the diluent supply conduit. The nozzle may be in fluid communication with the gas supply conduit, the reductant supply conduit and the diluent supply conduit. The pump may be disposed between the nozzle and the second valve and may be in fluid communication with the reductant supply conduit and the diluent supply conduit. The first and second gas flow paths may extend between and fluidly communicate with the gas supply conduit and the nozzle. The reductant supply conduit may include a third valve disposed between the pump and the reductant source. The third valve may be movable between open and closed positions to control a flow of reductant between the reductant source and the pump.

In another form, the present disclosure provides a method of operating an exhaust treatment system. The method may include operating a pump in a first direction to pump reductant from a reductant source to a nozzle. The pump may be operated in a second direction opposite the first direction to pump reductant toward the reductant source. The pump may be operated in the first direction to pump diluent from a diluent source to the nozzle.

In some embodiments, the method may include shutting down the pump and forcing compressed air through the pump in the second direction.

In some embodiments, the method may include providing compressed air to the nozzle simultaneously with operating the pump in the first direction to pump reductant from the reductant source to the nozzle.

In some embodiments, a valve may be closed to restrict communication between the reductant source and the pump while operating the pump in the first direction to pump diluent from the diluent source to the nozzle.

In some embodiments, the method may include operating the pump in the second direction to pump diluent toward the diluent source.

In another form, the present disclosure provides a method of operating an exhaust treatment system. The method may include pumping reductant through a conduit in a first direction from a reductant source to a nozzle and simultaneously supplying compressed air to the nozzle. One or more of reductant, air and diluent may be forced through the conduit in a second direction toward the reductant source. A flow of diluent may be provided through the conduit in the first direction.

In some embodiments, the method may include providing diluent to the nozzle simultaneously with supplying compressed air to the nozzle and simultaneously with pumping reductant through the conduit in the first direction from the reductant source to the nozzle.

In some embodiments, forcing one or more of reductant, air and diluent through the conduit in the second direction toward the reductant source includes forcing reductant through the conduit in the second direction toward the reductant source.

In some embodiments, the method may include forcing air through the conduit in the second direction.

In some embodiments, the method may include forcing diluent through the conduit in the second direction.

In some embodiments, diluent may be injected into an exhaust stream upstream of the nozzle.

In another form, the present disclosure provides an aftertreatment system treats exhaust gas from an engine. The aftertreatment system may include a reductant supply conduit, a diluent supply conduit, an injector and a control module. The reductant supply conduit may be in fluid communication with a reductant source and may include a first valve controlling a flow of reductant through the reductant supply conduit. The diluent supply conduit may be in fluid communication with a diluent source and may include a second valve controlling a flow of diluent through the diluent supply conduit. The injector may be in fluid communication with the reductant supply conduit and the diluent supply conduit. The injector may be configured to provide fluid to a stream of the exhaust from the engine. The injector may have a minimum flow rate threshold. The control module may control the first valve to provide a targeted amount of reductant through the injector for a given engine operating parameter. The control module may control the second valve to maintain a fluid flow rate through the injector that is at or above the minimum flow rate threshold based on a difference between a flow rate through the reductant supply conduit and the minimum flow rate threshold.

In some embodiments, the minimum flow rate threshold is a minimum flow rate at which the injector is able to produce a desired spray pattern.

In some embodiments, the control module controls the second valve to increase a flow rate through the injector in response to a risk of formation of reductant deposits (e.g., on the injector).

In some embodiments, the first and second valves are pulse-width-modulated.

In some embodiments, a fluid conduit connecting the injector with the reductant supply conduit and the diluent supply conduit includes a pump and a filter.

In some embodiments, the fluid conduit includes a mixing chamber disposed upstream of the injector.

In some embodiments, the mixing chamber includes a first reductant quality sensor measuring a potency of a mixture of reductant and diluent in the mixing chamber. A second reductant quality sensor may be disposed on the reductant supply conduit upstream of the mixing chamber and measures a potency of the reductant in the reductant supply conduit.

In some embodiments, the pump is operable in a first pumping direction to pump diluent from the diluent source to the injector. The pump may be operable in a second pumping direction opposite the first pumping direction to pump fluid away from the nozzle and toward the reductant source and/or the diluent source. The system may first purge the fluid back to the reductant source and then purge fluid back to the diluent source.

In some embodiments, exhaust aftertreatment system includes an air supply conduit in fluid communication with a source of air and the injector.

In another form, the present disclosure provides a method of operating an exhaust aftertreatment system. The method may include identifying a minimum flow rate threshold of an injector; controlling a first flow rate of reductant to the injector to provide a targeted amount of reductant to the injector to treat exhaust gas from an engine; and controlling a second flow rate of diluent to the injector such that a sum of the first and second flow rates is greater than or equal to a minimum flow rate threshold of the injector.

In some embodiments, the minimum flow rate threshold is a minimum flow rate at which the injector is able to produce a desired spray pattern.

In some embodiments, controlling the first flow rate includes reducing the first flow rate below the minimum flow rate threshold of the injector.

In some embodiments, controlling the first flow rate includes increasing the first flow rate above the minimum flow rate threshold of the injector.

In some embodiments, controlling the second flow rate includes reducing the second flow rate to zero.

In some embodiments, the method includes identifying a risk of formation of reductant deposits (e.g., on the injector).

In some embodiments, the risk is identified based on engine operating conditions.

In some embodiments, controlling the second flow rate includes increasing the total flow rate through the injector in response to the risk of formation of reductant deposits.

In some embodiments, increasing the total flow rate through the injector in response to the risk of formation of reductant deposits includes maintaining an amount of reductant supplied to the injector while reducing a concentration of the reductant supplied to the injector.

In some embodiments, controlling the first and second flow rates includes controlling first and second valves, respectively.

In some embodiments, the first and second valves are pulse-width-modulated valves and controlling the first and second valves includes controlling the duty cycles of the first and second valves.

In another form, the present disclosure provides a method of operating an exhaust aftertreatment system. The method may include identifying a level of risk of urea deposit formation on an injector; controlling a first flow rate of reductant to the injector to provide a targeted amount of reductant to the injector to treat exhaust gas from an engine; and controlling a second flow rate of diluent to the injector to increase a total fluid flow rate through the injector beyond the first flow rate while simultaneously providing the targeted amount of reductant to the injector.

In some embodiments, the method may include identifying a minimum flow rate threshold of an injector; and controlling a second flow rate of diluent to the injector such that a sum of the first and second flow rates is greater than or equal to a minimum flow rate threshold of the injector.

In some embodiments, the minimum flow rate threshold is a minimum flow rate at which the injector is able to produce a desired spray pattern.

In some embodiments, controlling the first flow rate includes reducing the first flow rate below the minimum flow rate threshold of the injector.

In some embodiments, controlling the first flow rate includes increasing the first flow rate above the minimum flow rate threshold of the injector.

In some embodiments, controlling the second flow rate includes reducing the second flow rate to zero.

In some embodiments, the level of risk is identified based on engine operating conditions.

In some embodiments, increasing the total flow rate through the injector in response to the risk of formation of reductant deposits includes maintaining an amount of reductant supplied to the injector while reducing a concentration of the reductant supplied to the injector.

In some embodiments, controlling the first and second flow rates includes controlling first and second valves, respectively.

In some embodiments, the first and second valves are pulse-width-modulated valves and controlling the first and second valves includes controlling the duty cycles of the first and second valves.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
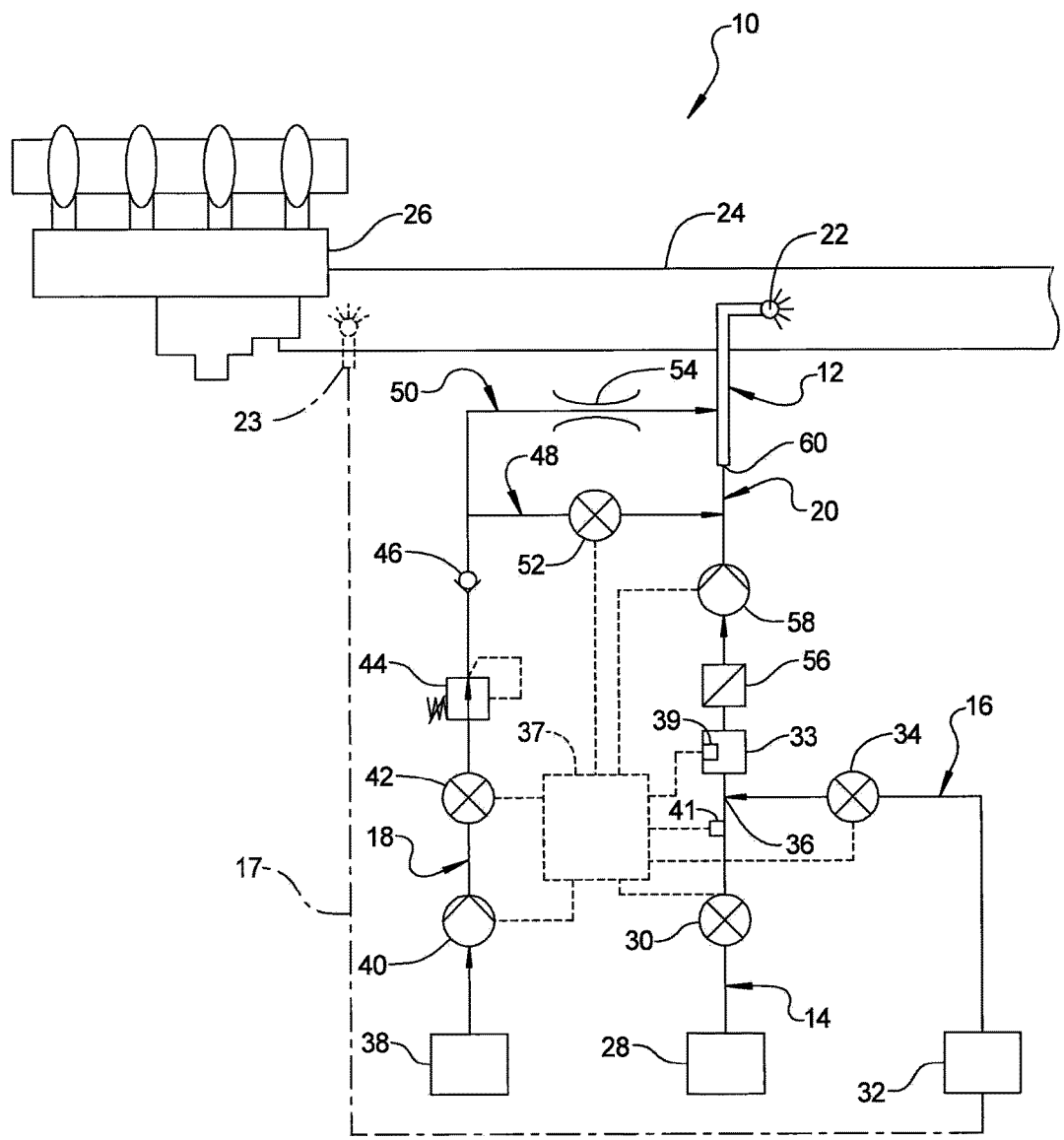
FIG. 1 is a schematic representation of an engine and exhaust treatment system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

With reference to FIG. 1, a reductant delivery system 10 is provided that may include an injector 12 in fluid communication with a reductant supply conduit 14, a water supply conduit 16, an air supply conduit 18, and a fluid delivery conduit 20. The injector 12 may include a nozzle 22 configured to spray air, reductant (e.g., urea) and/or water into a stream of exhaust gas flowing through an exhaust pipe 24 connected to a combustion engine 26. As will be described in more detail below, air and/or water may be used to purge and/or clean the reductant delivery system 10. The reductant delivery system 10 and engine 26 may be incorporated into a vehicle (e.g., an automotive land vehicle, a marine vehicle, an aircraft or a locomotive) or any other system or machinery.

The reductant supply conduit 14 may be in fluid communication with a reductant source 28 (e.g., a reductant tank) and may include a first valve 30. The water supply conduit 16 may be in fluid communication with a water source 32 (or a source of some other diluent) and may include a second valve 34. In marine applications (i.e., in embodiments where the combustion engine 26 and reductant delivery system 10 are installed in a boat, ship or other marine vessel), the water source could be a ballast tank, a bilge and/or bilge pump, or a body of water in which the vessel is afloat, for example. In some embodiments, the water source 32 could be a water storage tank dedicated to the reductant delivery system 10. The water supply conduit 16 may form a three-way intersection 36 with the reductant supply conduit 14 and the fluid delivery conduit 20.

The air supply conduit 18 may include an air source 38 (e.g., the ambient environment or an air tank), an air compressor or pump 40, a third valve 42, a pressure-reducing valve 44, and a check valve 46. The air compressor 40 may be disposed between the air source 38 and the third valve 42. The pressure-reducing valve 44 may be disposed between the third valve 42 and the check valve 46 and may reduce the pressure of air flowing therethrough to a level that is appropriate for use in the reductant delivery system 10. The check valve 46 may be in communication with first and second parallel airflow paths 48, 50. The check valve 46 may allow airflow therethrough in a first direction (i.e., from the third valve 42 to the first and second airflow paths 48, 50) and restrict or prevent airflow therethrough in a second direction (i.e., from the first and second airflow paths 48, 50 to the third valve 42). The first airflow path 48 may include a fourth valve 52 and may fluidly couple the air supply conduit 18 with the fluid delivery conduit 20. The second airflow path 50 may include a restrictor 54 and may fluidly couple the air supply conduit 18 with the injector 12.

The fluid delivery conduit 20 may include a filter 56 and a pump 58. In some embodiments, instead of or in addition to the single pump 58, a reductant pump (not shown) may be disposed along the reductant supply conduit 14 and a diluent pump (not shown) may be disposed along the diluent supply conduit 16. The filter 56 may be disposed between the three-way intersection 36 and the pump 58. The first airflow path 48 may be connected to the fluid delivery conduit 20 at a location between an inlet 60 of the injector 12 and the pump 58.

Operation of the pump 58, the first, second, third and fourth valves 30, 34, 42, 52 and/or the air compressor 40 may be controlled by a control module 37. The first, second, third and fourth valves 30, 34, 42, 52 may be solenoid valves, for example, or any other suitable electromechanical valve. The pump 58 may be operable in a first mode to pump fluid in a first direction (e.g., from the supply conduits 14, 16 toward the inlet 60 of the injector 12) and in a second mode to pump fluid in an opposite direction (e.g., from the inlet 60 of the injector 12 toward the supply conduits 14, 16). In some embodiments, the air compressor 40 may be controlled separately and independently from the reductant delivery system 10. In some embodiments, the air compressor 40 and air source 38 may be used for various other systems onboard the vehicle in which the reductant delivery system 10 is installed.

Figure 2:
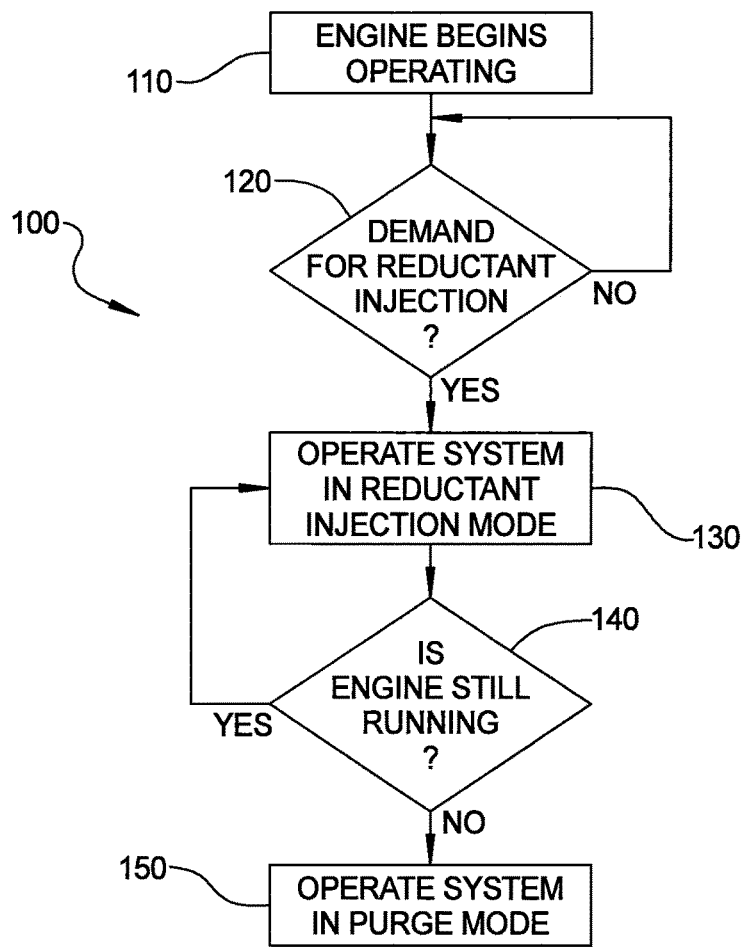
FIG. 2 is a flow chart illustrating operation of the exhaust treatment system according to the principles of the present disclosure.

With continued reference to FIGS. 1-3, operation of the reductant delivery system 10 will be described in detail. As described above, the reductant delivery system 10 may be operable in a reductant injection mode and a purge mode. In the reductant injection mode, the injector 12 may inject air, reductant and/or water into the stream of exhaust gas in the exhaust pipe 24. In the purge mode, air from the air source 38 and/or water from the water source 32 may be used to purge and/or clean the reductant delivery system 10. In some embodiments, the air compressor 40 may provide a constant supply of compressed air upstream of the third valve 42 during the reductant injection mode and during the purge mode.

A method 100 (FIG. 2) of operating the reductant delivery system 10 may begin at step 110 when operation of the engine 26 begins. Upon ignition of the engine 26, the control module 37 may determine at step 120 whether there is a demand for reductant to be injected into the exhaust stream. This determination may be made based on engine operating parameters, for example. If the control module 37 determines that there is a demand for reductant injection, the control module 37 may cause the reductant delivery system 10 to operate in the reductant injection mode at step 130.

In the reductant injection mode, air from the air source 38 and reductant from the reductant source 28 may be injected into the exhaust stream through the nozzle 22. That is, the first valve 30 and the third valve 42 may be in open positions and the pumps 40, 58 may pump the air and reductant from the reductant and air sources 28, 38 through the injector 12. In some embodiments, the second valve 34 may be closed during the reductant injection mode to restrict or prevent water from being pumped through the injector 12. In some embodiments, the fourth valve 52 may be closed during the reductant injection mode, thereby forcing the air from the air supply conduit 18 into the injector 12 (or into a mixing chamber upstream of the injector 12) through the second airflow path 50 and restricting or preventing airflow through the first airflow path 48. The injector 12 may atomize the reductant and inject the mixture of air and reductant into the stream of exhaust gas.

In some embodiments, before and/or after step 130 in which the system 10 operates in the reductant injection mode, the control module 37 may operate the system 10 in a water injection mode in which the second valve 34 may be opened, the first, third and fourth valves 30, 42, 52 may be closed and the pump 58 may operate in the first direction to pump water through the water supply conduit 16, through the fluid delivery conduit 20 and through the injector 12 and nozzle 22. The nozzle 22 may spray the water into the exhaust stream. Operating the system 10 in the water injection mode can aid in decomposition of reductant deposits that may form throughout the system 10, in the exhaust pipe 24 and/or on exhaust aftertreatment devices (e.g., a diesel particulate filter (DPF) and/or a diesel oxidation catalyst (DOC)).

In some embodiments, water from the water source 32 may be injected into the exhaust stream through a water-injection line 17 and water-injection nozzle 23 (both shown in FIG. 1 in phantom lines) disposed upstream from the nozzle 22 before, during and/or after operation of the system 10 in the reductant injection mode. Injecting water into the exhaust stream upstream of the nozzle 22 increases water vapor concentration in the exhaust steam, which may reduce or prevent formation of urea deposits (e.g., biurets and triurets) at and/or downstream of the nozzle 22. In some embodiments, one or more components disposed downstream of the nozzle 22 (e.g., a mixer and/or a suspension plate) may include a hydrolysis catalyst coating that may further aid in reducing formation of urea deposits.

At step 140, the control module 37 may determine whether the engine 26 is still running. If the engine 26 is still running, the control module 37 may continue to operate the reductant delivery system 10 in the reductant delivery mode. Upon shutdown of the engine 26, the control module 37 may operate the reductant delivery system 10 in the purge mode at step 150. In the purge mode, the injector 12 and the conduits 14, 20 (including the first valve 30, filter 56 and/or pump 58 disposed along conduits 14, 20) may be purged and/or cleaned to prevent deposits from building up on various system components and to prevent reductant and/or water from freezing within the injector 12, the conduits 14, 20, first valve 30, filter 56 and/or pump 58. In some embodiments, the control module 37 may periodically operate the system 10 in the purge mode while the engine 26 is running.

Figure 3:
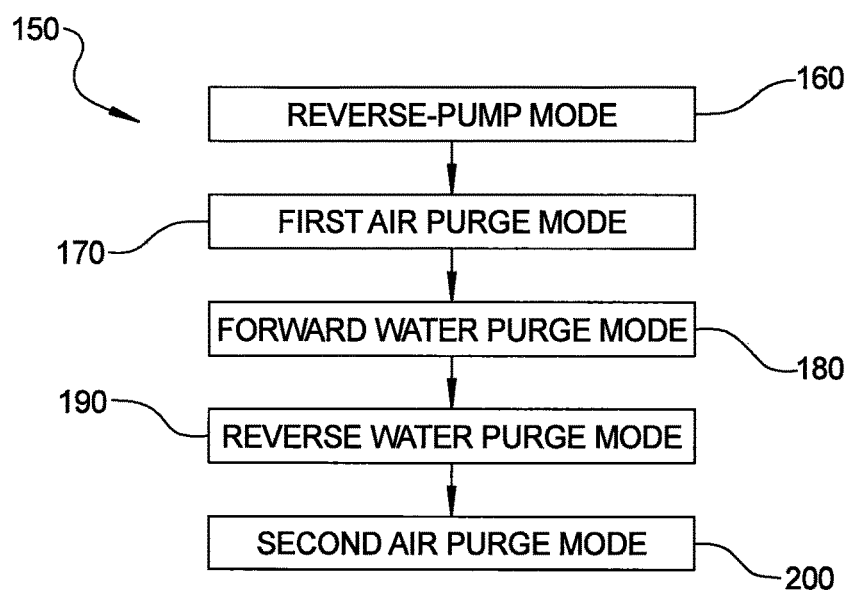
FIG. 3 is a flow chart illustrating operation of the exhaust treatment system in a purge mode according to the principles of the present disclosure.

With reference to FIG. 3, method steps for operating the reductant delivery system 10 in the purge mode will be described in detail. The purge mode may begin at step 160, where the system 10 may be operated in a reverse-pump mode. In the reverse-pump mode, the first valve 30 may be open, the second, third and fourth valves 34, 42, 52 may be closed, and the pump 58 may operate in the second (reverse) pumping direction to pump fluid in a direction from injector 12 toward the reductant source 28. In this manner, the reductant in the injector 12, the fluid delivery conduit 20 and the reductant supply conduit 14 may be pumped back into to the reductant source 28.

Next, at step 170, the control module 37 may cause the system 10 to operate in a first air purge mode. In the first air purge mode, the second valve 34 may remain in the closed position, the first valve 30 may remain in the open position, the third and fourth valves 42, 52 may be opened, and the pump 58 may be shut down. With the first, third and fourth valves 30, 42, 52 open and the second valve 34 closed, the compressed air from the air supply conduit 18 may flow through the first airflow path 48 to the fluid delivery conduit 20. The air may continue to flow through the fluid delivery conduit 20, through the pump 58 and filter 56 and through the reductant supply conduit 14. In this manner, the air may purge liquid from the fluid delivery conduit 20, pump 58, filter 56 and reductant supply conduit 14.

Next, at step 180, the control module 37 may cause the system 10 to operate in a forward water purge mode. In the forward water purge mode, the second valve 34 may be opened, the first, third and fourth valves 30, 42, 52 may be closed, and the pump 58 may be operated in the first pumping direction to pump water from the water source 32 through the filter 56, pump 58, injector 12 and nozzle 22. Pumping water through the filter 56, pump 58, injector 12 and nozzle 22 may dissolve deposits in the filter 56, pump 58, injector 12 and nozzle 22 that may have formed due to reductant flowing therethrough.

Next, at step 190, the control module 37 may cause the system 10 to operate in a reverse water purge mode. In the reverse water purge mode, the second valve 34 remain opened and the first, third and fourth valves 30, 42, 52 may remain closed, and the pump 58 may be operated in the second pumping direction to pump water from the injector 12, fluid delivery conduit 20, pump 58 and filter 56 back to the water source 32 (or to a location between the second valve 34 and the water source 32).

Finally, at step 200, the control module 37 may cause the system 10 to operate in a second air purge mode. In the second air purge mode, the first valve 30 may remain closed, the second, third and fourth valves 34, 42, 52 may be opened, and the pump 58 may be shut down. In this mode, compressed air from the air supply conduit 18 may flow through the first airflow path 48 to the fluid delivery conduit 20. The air may continue to flow through the fluid delivery conduit 20, through the pump 58, filter 56 and through the water supply conduit 16. In this manner, the air may purge liquid from the fluid delivery conduit 20, pump 58, filter 56 and water supply conduit 16.

Figures 4, 5:
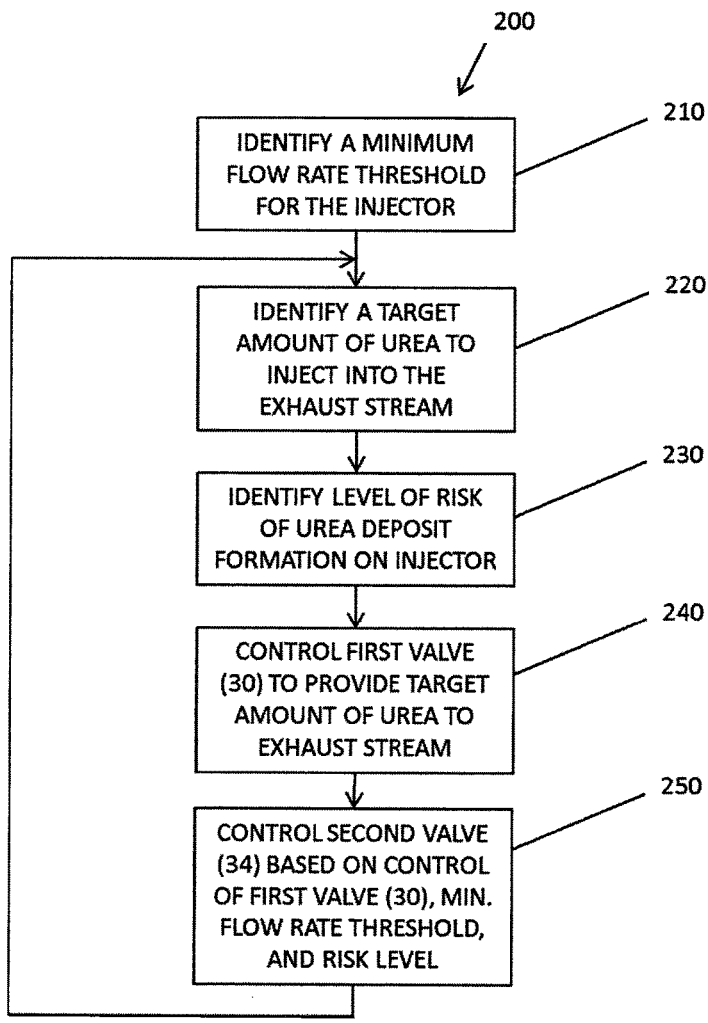
FIG. 4 is a table providing exemplary flow rate values for various operating conditions for an exemplary engine and exhaust treatment system.
FIG. 5 is a flowchart illustrating a method of controlling the exhaust treatment system.

With reference to FIGS. 1, 4 and 5, another method of operating the reductant delivery system 10 in the reductant injection mode will be described. The method is applicable to either an air-assisted reductant injection mode or an airless reductant injection mode. As described above, the first and second valves 30, 34 may be operable to control the amounts of urea and water that are provided to the injector 12. In some embodiments, the first and second valves 30, 34 could be pulse-width-modulated (PWM). The control module 37 can control the PWM duty cycles of the first and second valves 30, 34 and/or the duty cycle or speed of the pump 58 to control a concentration and flow rate of the fluid injected into the exhaust stream. The control module 37 may control the valves 30, 34 to maintain at least a minimum flow rate through the injector 12 to allow for proper performance (e.g., proper atomization, spray quality or spray cone angle) of the injector 12 and to reduce or eliminate urea tip deposits on the injector 12 while providing a targeted amount of urea and flow rate to adequately treat the exhaust gas under various engine conditions. Controlling the ratio of urea to water in this manner may reduce or eliminate the need for air injection (i.e., reduce or eliminate the need for atomization provided by air injection).

In some embodiments, the fluid delivery conduit 20 may include a mixing chamber 33 in which the urea from the reductant supply conduit 14 and water from the water supply conduit 16 can mix prior to being injected into the exhaust stream. For example, the mixing chamber 33 could be disposed upstream of the filter 56 (i.e., between the filter 56 and the intersection 36). In some embodiments, a first urea quality sensor 39 could be disposed within the mixing chamber 33 to measure the potency of the fluid therein and communicate this data to the control module 37. In some configurations, a second urea quality sensor 41 could be disposed along the reductant supply conduit 14 upstream from the mixing chamber 33 to measure the potency of the reductant therein and communicate this data to the control module 37. In some embodiments, air could be injected into the mixing chamber 33. In some embodiments, an accumulator could be used instead of the mixing chamber 33. Neither the mixing chamber 33 nor the accumulator may be necessary in configurations having an in-line filter and/or where the fluid supply conduit 20 is sufficiently long to allow for sufficient mixing of the urea and water prior to injection into the exhaust stream. In some embodiments, a pressure sensor and/or NOx sensor may be disposed along the fluid delivery conduit 20 and may be in communication with the control module 37.

As described above, the control module 37 can maintain at least a minimum fluid flow rate through the injector 12. For example, under engine operating conditions that produce low emissions, only a relatively small amount of urea may be needed to treat the exhaust gas. Therefore, under such conditions, the control module 37 may adjust the duty cycle of the valves 30, 34 to reduce the flow rate of the urea from the reductant supply conduit 14 and tank 28 (which may contain a urea concentration of 40% $NH_3$ and 60% water) and increase the flow rate of the water from the water supply conduit 16 to maintain the total flow rate through the injector 12 at or above a minimum threshold (for example, about ten grams per second). In this manner, the control module 37 can reduce or eliminate dosing errors and maintain a desired spray quality and spray cone angle of fluid exiting the nozzle 22.

Controlling the system 10 in this manner eliminates the need for separate low-dosing and high-dosing injectors. That is, a single injector 12 can be used in both in low-dosing conditions (e.g., where less than about 10 grams per second of 40% concentration urea is desirable) and in high-dosing conditions (e.g., where 10 grams per second or more 40% concentration urea is desirable)

Furthermore, at predetermined engine runtime intervals (or when other engine operating conditions indicate a higher risk of urea deposit formation) and/or in response to detection of urea deposits forming on the injector 12, the control module 37 may increase the flow rate through the injector 12 by increasing the flow rate of the water from the water supply conduit 16 while still providing the desired amount of urea to chemically react with the exhaust gas. The increased flow rate through the injector 12 may reduce or eliminate the deposits while a desired dosing of urea can still be injected into the exhaust stream to suit given engine operating conditions (e.g., any one or more of engine speed, load, engine temperature, exhaust gas temperature, engine runtime, etc.).

FIG. 4 provides several examples of urea and water flow rates that the control module 37 may control the valves 30, 34 and pump 58 to achieve. The examples provided in FIG. 4 are based on an embodiment of the system 10 in which 10 grams per second is the minimum flow rate threshold for proper performance of the injector 12 (i.e., the minimum flow rate through the injector 12 that produces adequate spray quality).

In Example 1 of FIG. 4, the engine operating conditions may be such that 10 grams per second of urea is an appropriate flow rate to provide an appropriate amount (i.e., a target amount) of urea into the exhaust stream to sufficiently treat the exhaust gas. Because the flow rate of the urea under such conditions is at least equal to the minimum flow rate threshold for proper performance of the injector 12, the control module 37 can reduce the duty cycle of the second valve 34 to zero (i.e., prevent any flow through the second valve 34).

In Examples 2 and 3 of FIG. 4, the engine operating conditions may be such that that a urea flow rate of 10 grams per second provides an appropriate amount of urea into the exhaust stream, however, one or more engine operating conditions (i.e., high engine speed, engine load, engine temperature, exhaust temperature, engine runtime, etc.) may also indicate an increased risk of urea deposit formation on the injector 12 (or in some embodiments, actual urea deposit formation may be detected). Therefore, the control module 37 may increase the duty cycle of the second valve 34 accordingly to increase the total flow rate through the injector 12 to clean urea deposit off of the injector 12 while still maintaining the target amount of urea (e.g., 10 grams per second of urea) to the exhaust stream.

In Examples 4-6, the engine operating conditions may be such that that a urea flow rate of 20 grams per second provides an appropriate amount of urea into the exhaust stream. As shown in FIG. 4, the control module 37 can adjust the flow rate of the water according to risk-level of urea deposit formation (or according to a severity of deposits actually detected). If the risk of deposit formation is low or nonexistent, the control module can reduce the duty cycle of the second valve 34 to zero (as in Example 4) to prevent flow through the second valve 34 since the urea flow rate in Example 4 is above the minimum flow rate threshold for proper performance of the injector 12.

In Example 7 of FIG. 4, the engine operating conditions may be such that that a urea flow rate of 5 grams per second provides an appropriate amount of urea into the exhaust stream. Under such conditions, the control module 37 can decrease the duty cycle of the first valve 30 to yield a urea flow rate of 5 grams per second (even though 5 grams per second is below the minimum flow rate threshold for proper performance of the injector 12). To achieve at least the minimum flow rate threshold for the injector 12, the control module 37 may increase the duty cycle of the second valve 34 to 5 grams per second or more to raise the total fluid flow rate through the injector to 10 grams per second or more.

It will be appreciated that Examples 1-7 are provided for illustration purposes only, and that many other combinations of flow rate values and/or minimum threshold values may be applicable for a given application.

FIG. 5 depicts a method 200 for controlling the system 10 according to the principles described above. At step 210 of the method 200, the control module 37 may identify the minimum flow rate threshold for proper performance of the injector 12. Such information may be stored in a memory circuit associated with the control module 37 by a manufacturer of the system 10 or manufacturer of the vehicle in which the system 10 is installed, for example.

At step 220, the control module may identify a target amount of urea to inject into the exhaust stream. As described above, the target amount may be a flow rate through the reductant supply conduit 14 that provides an appropriate amount of urea into the exhaust stream to sufficiently treat the exhaust gas. The target amount may be determined by the control module 37 based on engine operating conditions (e.g., engine speed, engine load, engine temperature, exhaust temperature, engine runtime, etc.).

At step 230, the control module 37 may identify a level of risk of urea deposit formation on the injector 12. As described above, engine operating conditions such as high engine speed, high engine load, high engine temperature, high exhaust temperature, and/or high engine runtime, for example, may indicate an increased risk level for formation or urea deposits on the injector 12. In some embodiments, the control module may identify the risk level based on actual detection of urea deposits on the injector 12.

At step 240, the control module 37 may control the first valve 30 to provide the target amount of urea to the exhaust stream. That is, a duty cycle of the first valve 30 can be adjusted to provide a flow rate of urea through the reductant supply conduit 14 that corresponds to the target amount of urea. At step 250, the control module 37 may control the second valve 34 based on the duty cycle of the first valve 30, the minimum flow rate threshold determined at step 210, and the risk level determined at step 230. That is, the control module 37 may adjust the duty cycle of the second valve 34 to achieve a total fluid flow rate through the injector 12 (i.e., the sum of the urea and water flow rates through the reductant supply conduit 14 and water supply conduit 16, respectively) that is greater than or equal to the minimum flow rate threshold and greater than or equal to a flow rate that is sufficient to clean urea deposits from the injector 12 and/or prevent the formation of urea deposits on the injector 12.

In some configurations, the control module 37 can adjust the positions or duty cycles of one or both of the valves 30, 34 based on data received from either or both of the first and second urea quality sensors 39, 41 at any point in any of the above method steps.

In this application, the term "module" may be replaced with the term "circuit." The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; memory circuit (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart elements and descriptions above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An aftertreatment system for treating exhaust gas from an engine, the aftertreatment system comprising:
   a reductant supply conduit in fluid communication with a reductant source and including a first valve controlling a flow of reductant through the reductant supply conduit;
   a diluent supply conduit in fluid communication with a diluent source and including a second valve controlling a flow of diluent through the diluent supply conduit;
   an injector in fluid communication with the reductant supply conduit and the diluent supply conduit, the injector configured to provide fluid to a stream of the exhaust from the engine, the injector having a minimum flow rate threshold; and
   a control module controlling the first valve to provide a targeted amount of reductant through the injector for a given engine operating parameter, the control module controlling the second valve to maintain a fluid flow rate through the injector at or above the minimum flow rate threshold based on a difference between a flow rate through the reductant supply conduit and the minimum flow rate threshold.

2. The exhaust aftertreatment system of claim 1, wherein the minimum flow rate threshold is a minimum flow rate at which the injector is able to produce a predetermined spray pattern.

3. The exhaust aftertreatment system of claim 1, wherein the control module controls the second valve to increase a flow rate through the injector in response to a risk of formation of reductant deposits.

4. The exhaust aftertreatment system of claim 1, wherein the first and second valves are pulse-width-modulated.

5. The exhaust aftertreatment system of claim 1, wherein a fluid conduit connecting the injector with the reductant supply conduit and the diluent supply conduit includes a pump and a filter.

6. The exhaust aftertreatment system of claim 5, wherein the fluid conduit includes a mixing chamber receiving reductant and diluent, the mixing chamber disposed upstream of the injector.

7. The exhaust aftertreatment system of claim 6, wherein the mixing chamber includes a first reductant quality sensor measuring a potency of a mixture of reductant and diluent in the mixing chamber, and wherein a second reductant quality sensor is disposed on the reductant supply conduit upstream of the mixing chamber and measures a potency of the reductant in the reductant supply conduit.

8. The exhaust aftertreatment system of claim 1, wherein the pump is operable in a first pumping direction to pump diluent from the diluent source to the injector, and wherein the pump is operable in a second pumping direction opposite the first pumping direction to pump fluid away from the injector and toward at least one of the reductant source and the diluent source.

9. The exhaust aftertreatment system of claim 1, further comprising an air supply conduit in fluid communication with a source of air and the injector.

10. The exhaust aftertreatment system of claim 1, wherein the diluent source includes a source of water.

11. A method of operating an exhaust aftertreatment system, the method comprising:
identifying a minimum flow rate threshold of an injector;
controlling a first flow rate of reductant to the injector to provide a targeted amount of reductant to the injector to treat exhaust gas from an engine; and
controlling a second flow rate of a diluent to the injector such that a sum of the first and second flow rates is greater than or equal to the minimum flow rate threshold of the injector.

12. The method of claim 11, wherein the minimum flow rate threshold is a minimum flow rate at which the injector is able to produce a predetermined spray pattern.

13. The method of claim 11, wherein controlling the first flow rate includes reducing the first flow rate below the minimum flow rate threshold of the injector.

14. The method of claim 11, wherein controlling the first flow rate includes increasing the first flow rate above the minimum flow rate threshold of the injector.

15. The method of claim 11, wherein controlling the second flow rate includes reducing the second flow rate to zero.

16. The method of claim 11, further comprising identifying a risk of formation of reductant deposits.

17. The method of claim 16, wherein the risk is identified based on engine operating conditions.

18. The method of claim 17, wherein controlling the second flow rate includes increasing a total flow rate through the injector in response to the risk of formation of reductant deposits.

19. The method of claim 18, wherein increasing the total flow rate through the injector in response to the risk of formation of reductant deposits includes maintaining an amount of reductant supplied to the injector while reducing a concentration of the reductant supplied to the injector.

20. The method of claim 11, wherein controlling the first and second flow rates includes controlling first and second valves, respectively.

21. The method of claim 20, wherein the first and second valves are pulse-width-modulated valves and controlling the first and second valves includes controlling duty cycles of the first and second valves.

22. The method of claim 11, wherein the diluent is water.

23. A method of operating an exhaust aftertreatment system, the method comprising:
identifying a level of risk of urea deposit formation;
controlling a first flow rate of reductant to an injector to provide a targeted amount of reductant to the injector to treat exhaust gas from an engine; and
controlling a second flow rate of diluent to the injector to increase a total fluid flow rate through the injector beyond the first flow rate while simultaneously providing the targeted amount of reductant to the injector.

24. The method of claim 23, wherein controlling the first flow rate includes reducing the first flow rate.

25. The method of claim 23, further comprising:
identifying a minimum flow rate threshold of the injector; and
controlling the second flow rate of diluent to the injector such that a sum of the first and second flow rates is greater than or equal to the minimum flow rate threshold of the injector.

26. The method of claim 25, wherein the minimum flow rate threshold is a minimum flow rate at which the injector is able to produce a predetermined spray pattern.

27. The method of claim 26, wherein controlling the first flow rate includes reducing the first flow rate below the minimum flow rate threshold of the injector.

28. The method of claim 25, wherein controlling the first flow rate includes increasing the first flow rate above the minimum flow rate threshold of the injector.

29. The method of claim 23, wherein controlling the second flow rate includes reducing the second flow rate to zero.

30. The method of claim 23, wherein the level of risk is identified based on engine operating conditions.

31. The method of claim 30, wherein increasing the total flow rate through the injector in response to the risk of formation of reductant deposits includes maintaining an amount of reductant supplied to the injector while reducing a concentration of the reductant supplied to the injector.

32. The method of claim 23, wherein controlling the first and second flow rates includes controlling first and second valves, respectively.

33. The method of claim 32, wherein the first and second valves are pulse-width-modulated valves and controlling the first and second valves includes controlling duty cycles of the first and second valves.

34. The method of claim 23, wherein the diluent is water.

* * * * *